Dec. 6, 1966   D. D. HAMILTON ETAL   3,289,865
VEHICLE LOG BUNK
Filed Dec. 15, 1964   5 Sheets-Sheet 1

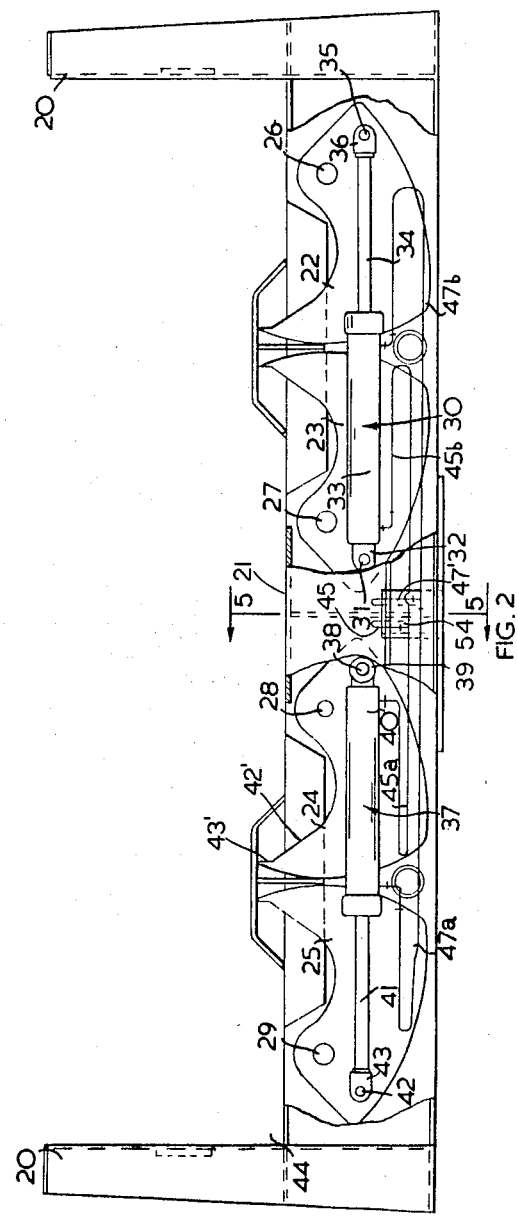

Dec. 6, 1966     D. D. HAMILTON ETAL     3,289,865
VEHICLE LOG BUNK

Filed Dec. 15, 1964     5 Sheets-Sheet 5

ID
3,289,865
Patented Dec. 6, 1966

3,289,865
VEHICLE LOG BUNK
Douglas D. Hamilton, Mount Royal, Quebec, Raoul Ranzenhofer, Pointe Claire, Quebec, and Robert Boivin, Montreal, Quebec, Canada, assignors of one-third each to Canadian International Paper Company, Montreal, Quebec, Canada, a corporation of Canada; Quebec North Shore Paper Company, Montreal, Quebec, Canada, a corporation of Quebec; and Abitibi St. Anne Paper Limited, Beaupre, Quebec, Canada, a corporation of Quebec
Filed Dec. 15, 1964, Ser. No. 418,516
Claims priority, application Canada, Mar. 19, 1964, 898,252
10 Claims. (Cl. 214—85)

This invention relates to a bunk for use on a self-loading full tree skidder.

In pending application 214,754 filed Aug. 3, 1962, now abandoned, there is disclosed a self-loading full tree skidder. The skidder consists of a self-propelled, self-loading vehicle which may be used to load logs on a bunk located on the vehicle whereby the logs may be dragged out from the felling area to the logging area without the use of cables and chokers, thus effecting a labour and cost reduction. The above application also discloses a novel tree bunk bar adapted to secure trees on the vehicle. The operation of such tree bunk bar involves the manipulation of a securing chain and field tests indicate that approximately ten percent of the time in operation is consumed by the manipulation of the securing chain.

The present invention relates to an improved bunk for a tree skidder. A primary feature of the present invention is a remotely actuated bunk which can secure to itself a number of tree butts while maintaining a low silhouette to avoid interference with the boom used to load logs onto the vehicle (as in application 214,754) and means for pivotably attaching the bunk to the skidding vehicle (as in application 214,754).

One of the basic principles of the present invention is that if the first layer of trees in the load can be secured to the bunk they will then form a "tray" for the balance of the load which need not then be secured. To discharge the load, the secured trees need only be released.

Another basic principle of the present invention is that if the secured trees can be held with a resilient grip there will be automatic compensation for load shifting thus minimizing the risk of loosing the load, damage to the trees themselves and strain on the gripping apparatus.

Still another basic principle of the present invention is that if interaction between gripping members can be introduced, it will compensate for the variation in size and number of butts held by each.

In general, the bunk of the present invention is provided by horizontally disposed back-to-back channels connected together with end posts projecting upwardly forming a U-shape to receive the tree butts. There is an apron at the rear to guide the load off the skidder on discharge and a pivot connection for mounting the bunk on the skidder.

The channels are spaced sufficiently apart to receive four pivotally mounted tongs which can be actuated by hydraulic cylinders. There are two tongs per cylinder with the cylinders and tongs being free-floating about the tong pin mounts. The cylinders are interconnected hydraulically so that they can be actuated by one valve. A hydraulic accumulator located on the pressure line for the closure stroke provides the tongs with a resilient grip which can compensate for load shifts.

Thus, by a broad aspect of the present invention, there is provided article retaining means comprising: a chassis; a pair of retaining arms pivotally secured at spaced apart points to said chassis; and prime mover means linked to said retaining arms for interrelating the motion of said arms to compensate for variations in the article to be separately retained by said arms; and retaining means also including abutment means disposed on said chassis in spaced relation with respect to said arms.

By another aspect of this invention, there is provided retaining means comprising at least two pair of tongs, mounted on a chassis of a U-shaped deck, each of said pair of tongs comprising: a first tong including a tip, a base and pivot means secured to said chassis at a first point; a second tong including a tip, a base and pivot means secured to said chassis at a second point remote from said first point so that the tips of said tongs are closely adjacent each other; and fluid actuated cylinder free-floatingly interconnecting said tongs by being pivotally secured at its piston rod and cylinder to the base of respective ones of said tongs.

By yet another aspect of this invention, there is provided an automatic tree bunk comprising: a chassis; a pair of spaced apart vertically disposed posts secured to said chassis; a generally horizontally disposed deck extending between said posts; two pairs of horizontally spaced apart interlinked tongs, each said pair of tongs comprising a first crescent-shaped tong including a tip, a base and pivot means secured to said chassis at a first point, a second similarly shaped tong including a tip, a base and pivot means secured to a second point on said chassis remote from said first point so that the tips of said tongs of the respective pairs are disposed in a direction facing away from one another and closely adjacent each other in an inoperative position, and prime mover means comprising a hydraulically actuated cylinder free-floatingly interconnecting each of said pairs of tongs while making said tongs class I levers by being pivotally secured at their piston rod and cylinders to the base of respective ones of said tongs, whereby the motion of said tongs in each pair are interrelated to compensate for variations in the article to be separately retained by said tongs; said spaced apart posts providing one set of abutment means, with the two centermost tongs interacting to provide a second set of abutment means; a guide ramp, associated with said pairs of tongs, for guiding articles off said bunk during discharge therefrom; a pivotal connection at the front of said bunk for interconnection to a self-propelled vehicle; the fluid circuit of said cylinders being interconnected whereby said cylinders may be actuated by a single valve.

By still another aspect of this invention, there is provided means for operating two hydraulically actuated linked cylinders comprising: a hydraulic pump, a line from said pump to a four-way valve; a line from said four-way valve to the base end of each said cylinder; a line from the rod end of each said cylinder to a hydraulic accumulator; a line from the hydraulic accumulator to said four-way valve; and a line from said four-way valve to a reservoir; said pump also being connected by a bench line to a relief valve; whereby, the closure stroke of said cylinders is actuated by pressure of hydraulic fluid in said hydraulic accumulator.

In the accompanying drawings which illustrate an embodiment of the present invention:

FIGURE 2 is a partial sectional front elevational view of the bunk of the present invention with the tongs in their "at rest" position;

Figure 1:
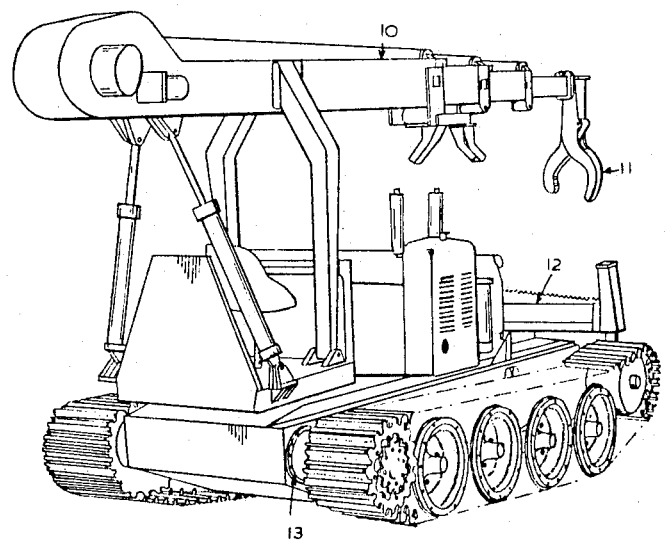
FIGURE 1 is a general perspective view of the skidder wherein the bunk of the present invention is mounted.

The entire skidder shown in FIGURE 1 may be considered to be a combination of several elements, namely a retractable boom 10, a grapple mechanism 11, a tree bunk mechanism 12 and a self-propelled vehicle 13. The boom 10, grapple mechanism 11 and self-propelled vehicle 13 have been adequately described in pending application 214,754. Accordingly, the present application will be concerned substantially with the description of the novel tree bunk mechanism 12.

As shown particularly in FIGURE 2, the bunk is generally defined by a pair of vertically disposed end posts 20 and a horizontally disposed deck 21 extending therebetween. The bunk includes two pairs of tongs, namely tongs 22 and 23 forming one pair and tongs 24 and 25 forming the second pair. Tong 22 is pivotally mounted on pin 26, tong 23 is pivotally mounted on pin 27, tong 24 is pivotally mounted on pin 28 and tong 25 is pivotally mounted on pin 29. The pins are suitably anchored to the structural members forming a deck. A hydraulic cylinder 30 is pivotally connected at opposed ends respectively to tongs 22 and 23. A pin 31 and clevis 32 pivotally connects the cylinder body 33 of the hydraulic cylinder 30 to the lower rear portion of tong 23, while the free end of the piston rod 34 is pivotally secured at the lower rear portion of the tong 22 by means of pin 35 and rod end clevis 36. Thus, the hydraulic cylinder and the tongs 22 and 23 are free-floatingly interconnected.

Similarly, tong 24 is pivotally connected adjacent its lower rear portion to a hydraulic cylinder 37 by means of pin 38 co-operating with a clevis 39 on the cylinder body 40. Tong 25 is pivotally connected adjacent its lower rear portion to the movable piston rod 41 of the hydraulic cylinder 37 by means of pin 42 and rod end clevis 43. In this way, the tongs 24 and 25 and the hydraulic cylinder 37 are free-floatingly interconnected.

As viewed in FIGURE 2 the phantom lines, tong 25 is rotated in a counterclockwise direction and tong 24 is rotated in a clockwise direction upon actuation of the hydraulic cylinder such as to move the piston rod inwardly into the cylinder, thus moving the tongs from an inoperative to an operative position. This movement enables the curved portion 42' and/or the toothed extension 43' of the curved portion to engage and anchor a butt 44 of a tree on the bunk. In this way, the tree is firmly secured.

Figure 6:
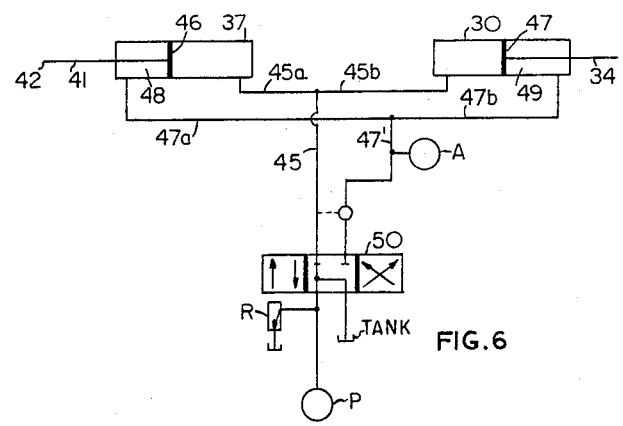
FIGURE 6 is a diagrammatic representation of the hydraulic lines which control the tongs of the bunk of the present invention.
Figure 3:
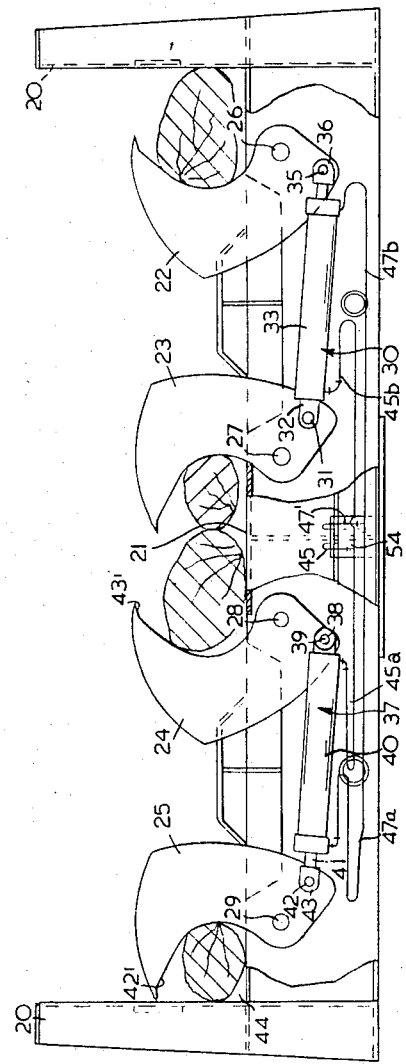
FIGURE 3 is a partial sectional front elevational view of the bunk of the present invention with the tongs in their "actuated" or work engaging position.
Figure 4:
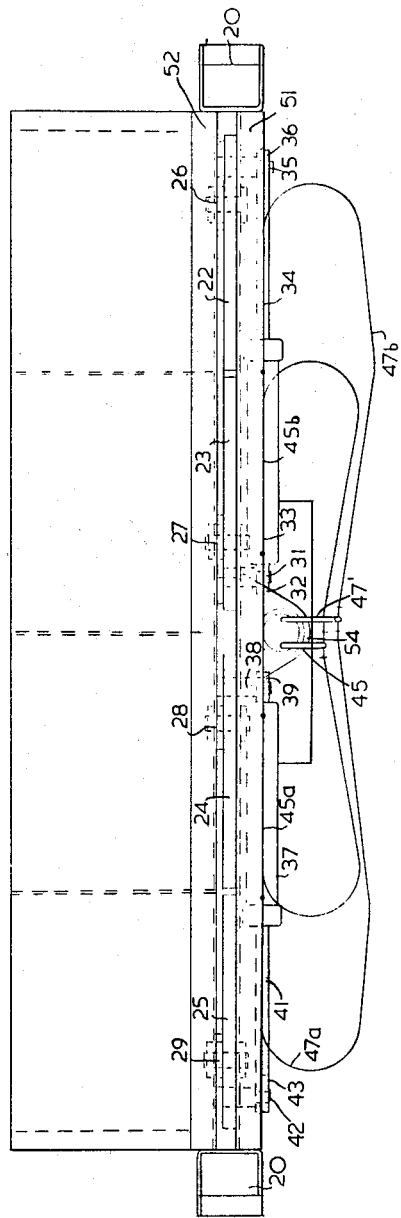
FIGURE 4 is a top plan view, particularly in section, of the bunk of the present invention.

It will also be observed that there are hydraulic lines interconnecting the various portions of the cylinder to a supply of hydraulic fluid. This is more clearly observed by viewing FIGURES 2 to 5. A hydraulic line 45 branches into line 45a leading to the base of hydraulic cylinder 37 and line 45b leading to the base of hydraulic cylinder 30. The point of entry into the cylinders is behind the face of the respective pistons 46 and 47 (see FIG. 6). A return hydraulic line 47' is provided by two branch lines; line 47a leading from the forward chamber 48 of cylinder 37 and line 47b leading from the forward chamber 49 of the hydraulic cylinder 30. Line 47' is connected to a hydraulic accumulator A which is seen to be on the pressure line for the closure so that the tongs are provided with a resilient grip which can compensate for load shifts, etc. Lines 45 and 47' then lead to a four-way valve 50 which can direct oil under pressure to line 47' for the closure stroke while holding 45 open to the tank for discharge—or the reverse—or a neutral position which traps the oil under pressure in line 47' thus fixing the position of the pistons except for the resiliency provided by the accumulator. The hydraulic system includes a tank T, a pressure supply pump P and a relief valve R as illustrated in FIGURE 6.

Figure 5:
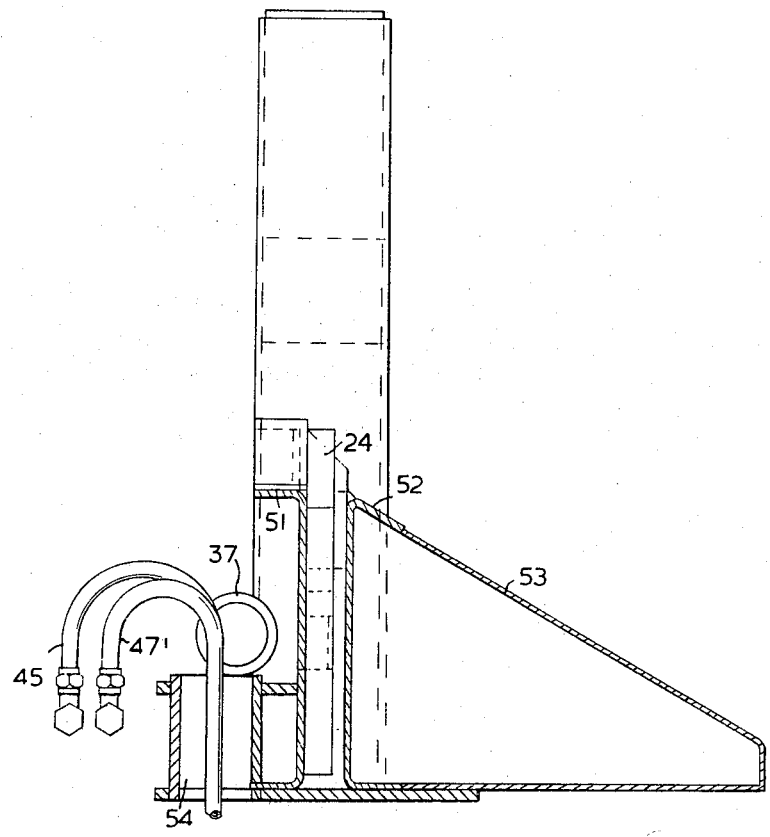
FIGURE 5 is a vertical cross-section of the bunk of the present invention taken substantially along section 5—5 of FIGURE 2.

Reference is now made to FIGURE 5 wherein the cross-section of the bunk is shown. The bunk is provided with a pair of U-channel members, namely a front U-channel member 51 and a rear U-channel member 52. Extending downwardly and interconnected to the rear U-channel member 52 is an apron 53 which can be used to guide the load off the skidder during discharge therefrom. Also seen is a sleeve and pivot mechanism 54 which enables the bunk to be pivotally secured to the skidder proper. Also shown are the hydraulic lines 45 and 47' which have been previously described.

In use, a number of trees are dropped on the bunk with the tongs in the retracted position. On closure of the tongs, the tongs sweep the butts into three pockets, two including the end posts and one being located between the center two tongs i.e., tongs 23 and 24. The free floating feature of the interconnection of the tongs and the hydraulic cylinders automatically compensates for the variation in number and size of trees caught up in each pocket. The balance of the load is arranged loosely on the top of these secured trees. The arcuate shape of the back of the tongs permits easy retraction from the load when it is to be dumped.

We claim:

1. Article retaining means comprising a chassis consisting of a generally horizontally disposed elongate member; a pair of retaining arms pivotally secured to said chassis respectively at points spaced longitudinally along said member, the pivot axis being substantially normal to the length of said member, and prime mover means pivotally secured to and interconnecting said arms for interrelating the motion of said arms to compensate for variations in the article to be separately retained by said arms, and abutment means consisting of a pair of vertically disposed, horizontally spaced, rigid posts secured to said chassis in spaced relation with respect to said arms and cooperating with respective ones thereof to provide a plurality of article engaging positions horizontally along said chassis.

2. Article retaining means as defined in claim 1 wherein each of said abutment means is disposed on said chassis adjacent said pivotal connection of said arms to said chassis and in spaced relation longitudinally along said chassis with respect to the free end of said arms.

3. Retaining means comprising a chassis, substantially U-shaped in cross-section, having a substantially horizontally disposed central portion and a pair of vertically disposed posts projecting upwardly therefrom in horizontally spaced relation, at least two pair of tongs pivotally secured to the central portion of said chassis, each of said pairs of tongs comprising a first tong including a tip, a base, and pivot means securing said tong to said chassis at a first point; a second tong including a tip, a base, and pivot means securing said second tong to said chassis at a second point remote from said first point so that the tips of said tongs are closely adjacent each other but facing in opposite directions in an inoperative position; and a fluid-actuated cylinder free-floatingly interconnecting each of said pairs of tongs, said cylinders each being pivotally secured at opposed ends to respective ones of the tongs in the respective pairs of tongs, the posts and the outermost tongs and the tongs between said outermost tongs providing a plurality of separate article engaging positions disposed longitudinally along said deck.

4. An automatic tree bunk comprising: a chassis; a pair of spaced apart upright posts on said chassis; a deck between said posts; two pairs of spaced apart interlinked tongs, each said pair of tongs comprising a first crescent-shaped tong including a tip, a base and pivot means securing said tong to said chassis at a first point, a second similarly shaped tong including a tip, a base and pivot means securing said second tong to said chassis at a second point remote from said first point so that the tips of said prongs are closely adjacent each other but facing in opposite directions in an inoperative position, and prime mover means comprising a hydraulically actuated cylinder, free-floatingly interconnecting said tongs while making said tongs class I levers by being pivotally secured by its base clevis to the base of one said tong and by its rod end to the base of the other said tong, whereby the motion of said tongs is interrelated to compensate for variations in the article to be separately retained by said tongs; said spaced apart posts providing one set of abutment means, with said adjacent tongs of adjacent pair of tongs interacting to provide a second set of abutment means.

5. A tree bunk as defined in claim 4 wherein the pivot axis of each of said tongs is substantially normal to a vertically disposed plane defined by said posts and said deck.

6. An automatic tree bunk comprising: a chassis; a pair of spaced apart upright posts on said chassis; a deck between said posts; two pairs of spaced apart interlinked tongs, each said pair of tongs comprising a first crescent-shaped tong including a tip, a base and pivot means securing said tong to said chassis at a first point, a second similarly shaped tong including a tip, a base and pivot means securing said second tong to said chassis at a second point remote from said first point so that the tips of said tongs are closely adjacent each other but directed in opposite directions in an inoperative position, and prime mover means comprising a hydraulically actuated cylinder free-floatingly interconnecting said tongs while making said tongs class I levers by being pivotally secured by its base clevis to the base of one said tong and by its rod end to the base of the other said tong, whereby the motion of said tongs is interrelated to compensate for variations in the article to be separately retained by said tongs; said spaced apart posts providing one set of abutment means, with said adjacent tongs of adjacent pair of tongs interacting to provide a second set of abutment means; and a guide ramp associated with said pairs of tongs for guiding articles off said bunk on discharge.

7. An automatic tree bunk comprising: a chassis; a pair of spaced apart upright posts on said chassis; a deck between said posts; two pairs of spaced apart interlinked tongs, each said pair of tongs comprising a first crescent-shaped tong including a tip, a base and pivot means securing said tong to said chassis at a first point, a second similarly shaped tong including a tip, a base and pivot means securing said second tong to said chassis at a second point remote from said first point so that the tips of said tongs are closely adjacent each other and disposed in opposite directions in an inoperative position, and prime mover means comprising a hydraulically actuated cylinder, free-floatingly interconnecting said tongs while making said tongs class I levers by being pivotally secured by its base clevis to the base of one said tong and by its rod end to the base of the other said long, whereby the motion of said tongs is interrelated to compensate for variations in the article to be separately retained by said tongs; said spaced apart posts providing one set of abutment means, with said adjacent tongs of adjacent pair of tongs interacting to provide a second set of abutment means; a guide ramp associated with said pairs of tongs for guiding articles off said bunk during discharge therefrom; and pivot means on said bunk for pivotally securing said bunk to a self-propelled vehicle to pivot about a substantially vertical axis.

8. An automatic tree bunk comprising: a chassis; a pair of spaced apart upright posts on said chassis; a deck between said posts; two pairs of spaced apart interlinked tongs, each said pair of tongs comprising a first crescent-shaped tong including a tip, a base and pivot means securing said tong to said chassis at a first point, a second similarly shaped tong including a tip, a base and pivot means securing said second tong to said chassis at a second point remote from said first point so that the tips of said tongs are closely adjacent each other but directed in opposite directions in an inoperative position, and prime mover means comprising a hydraulically actuated cylinder, free-floatingly interconnecting said tongs while making said tongs class I levers by being pivotally secured by its base clevis to the base of one said tong and by its rod end to the base of the other said tong, whereby the motion of said tongs is interrelated to compensate for variations in the article to be separately retained by said tongs; said spaced apart posts providing one set of abutment means, with said adjacent tongs of adjacent pair of tongs interacting to provide a second set of abutment means; said hydraulically actuated cylinder being interconnected hydraulically for actuation by a single valve.

9. An automatic tree bunk comprising: a chassis; a pair of spaced apart upright posts on said chassis; a deck between said posts; two pairs of spaced apart interlinked tongs, each said pair of tongs comprising a first crescent-shaped tong including a tip, a base and pivot means securing said tong to said chassis at a first point, a second similarly shaped tong including a tip, a base and pivot means securing said second tong to said chassis at a second point remote from said first point so that the tips of said tongs are closely adjacent each other and directed in opposite directions in an inoperative position, and prime mover means comprising a hydraulically actuated cylinder, free-floatingly interconnecting said tongs while making said tongs class I levers by being pivotally secured by its base clevis to the base of one said tong and by its rod end to the base of the other said tong, whereby the motion of said tongs is interrelated to compensate for variations in the article to be separately retained by said tongs; said spaced apart posts providing one set of abutment means, with said adjacent tongs of adjacent pair of tongs interacting to provide a second set of abutment means; said hydraulically actuated cylinders being interconnected hydraulically for actuation by a single valve; and including a hydraulic accumulator on the pressure line for the closure stroke for providing said tongs with a resilient gripping action to compensate for article shifting.

10. A tree bunk as defined in claim 9 wherein the pivot axis of each of said tongs is substantially normal to a vertically disposed plane defined by said posts and said deck.

References Cited by the Examiner
UNITED STATES PATENTS

| | | | |
|---|---|---|---|
| 2,734,646 | 2/1956 | Stimpson | 214—147 |
| 2,746,629 | 5/1956 | Sandland | 214—523 |
| 2,962,177 | 11/1960 | Pridgeon | 214—147 |
| 3,008,731 | 11/1961 | Bombardier | 214—3 X |
| 3,152,706 | 10/1964 | Conrad | 214—147 |

HUGO O. SCHULZ, *Primary Examiner.*